(12) United States Patent
Brown

(10) Patent No.: US 6,317,549 B1
(45) Date of Patent: Nov. 13, 2001

(54) OPTICAL FIBER HAVING NEGATIVE DISPERSION AND LOW SLOPE IN THE ERBIUM AMPLIFIER REGION

(75) Inventor: Charles S. Brown, Lithonia, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/317,360

(22) Filed: May 24, 1999

(51) Int. Cl.$^7$ .................................................. G02B 6/22
(52) U.S. Cl. ........................... 385/123; 385/126; 385/127
(58) Field of Search ..................... 385/123–128

(56) References Cited

U.S. PATENT DOCUMENTS

| | | |
|---|---|---|
| 4,691,991 | 9/1987 | Unger . |
| 4,715,679 | 12/1987 | Bhagavatula . |
| 5,327,516 | 7/1994 | Chraplyvy et al. ................... 385/123 |
| 5,361,319 | 11/1994 | Antos et al. .......................... 385/123 |
| 5,611,016 | 3/1997 | Fangmann et al. .................. 385/100 |
| 5,878,182 | 3/1999 | Peckham .............................. 385/123 |

FOREIGN PATENT DOCUMENTS 2116744   3/1983   (GB).

OTHER PUBLICATIONS

Bhagavatula, et al., "Dispersion–shifted Single–Mode Fiber For High–Bit–Rate and Multiwavelength Systems," *OFC '95 Technical Digest*, vol. 8, Feb. 26–Mar. 3, 1995, pp. 259–260.

Francois, P. L., Propagation Mechanisms In Quadruple––Clad Fibres: Mode Coupling, Dispersion And Pure Bend Losses, *Electronics Letters*, vol. 19, No. 21, Oct. 13, 1983, pp. 885–886.

Ohashi, et al., Dispersion–Modified Single–Mode Fiber by VAD Method, *The Transactions of the IEICE*, vol. E 73, No. 4, Apr. 1990, pp. 571–575.

Reed, et al., "Tailoring Optical Characteristics Of Dispersion–Shifted Lightguides For Applications Near 1–55 μm," *AT&T Technical Journal*, vol. 65, 1986, pp. 105–121.

*Primary Examiner*—Frank G. Font
*Assistant Examiner*—Amanda Merlino
(74) *Attorney, Agent, or Firm*—Michael A. Morra

(57) ABSTRACT

A optical fiber is disclosed that is suitable for use in a dispersion-compensated, optical communication system that is served by Erbium-doped fiber amplifiers. The fiber has a negative chromatic dispersion that is more negative than $-0.8$ ps/(nm-km) over the wavelength region 1530–1565 nm. and has a dispersion slope that is less than 0.05 ps/(nm$^2$-km). This fiber exhibits an average optical transmission loss that is less than 0.21 dB/km; and its effective area exceeds 50 μm$^2$, which renders it relatively insensitive to bending loss. The optical fiber includes a core of germanium-doped silica whose refractive index is $n_1$, and a layer of cladding material that surrounds the core. The cladding comprises approximately pure silica, whose refractive index is $n_2$. Between the core and the cladding, the fiber further includes first and second annular rings of doped silica. The first annular ring has a width of 4.5±1.5 microns, is doped with fluorine, and has a refractive index $n_3$. The second annular ring is doped with germanium and has a refractive index $n_4$. These indexes are constrained by the following equations:

$$0.45 < (n_1 - n_2)/n_2 < 0.58;$$

$$-0.09 < (n_3 - n_2)/n_2 < -0.05; \text{ and}$$

$$0.02 < (n_4 - n_2)/n_2 < 0.28.$$

15 Claims, 4 Drawing Sheets

OPTICAL FIBER HAVING NEGATIVE DISPERSION AND LOW SLOPE IN THE ERBIUM AMPLIFIER REGION

TECHNICAL FIELD

This invention relates to optical fibers, and more particularly to fibers that are suitable for use in dispersion-compensated optical communication systems.

BACKGROUND OF THE INVENTION

Optical transmission has become the darling of communication technology because of the enormous bandwidth that is available on an optical fiber. Such bandwidth enables thousands of telephone conversations and hundreds of television channels to be transmitted simultaneously over a hair-thin fiber that is generally made from a high-quality glass material. Transmission capacity over an optical fiber is increased in WDM systems wherein several channels are multiplexed onto a single fiber—each channel operating at a different wavelength. However, in WDM systems, nonlinear interactions between channels, such as 4-photon mixing, severely reduces system capacity. This problem has been largely solved by U.S. Pat. No. 5,327,516 that discloses an optical fiber that reduces these nonlinear interactions by introducing a small amount of chromatic dispersion at the operating wavelengths. Accordingly, it is desirable for an optical fiber to provide a small amount of chromatic dispersion to each of the WDM channels. And while the presence of dispersion is desirable for the purpose of minimizing 4-photon mixing, it is undesirable because it causes pulse spreading due to the fact that different wavelengths travel at different speeds through the fiber. Fortunately, pulse spreading can be dealt with by a dispersion-compensation technique wherein alternating sections of positive and negative dispersion fiber are concatenated. Normally, dispersion compensation is not required for communication systems that are shorter than about 50 kilometers.

Important advances have been made in the quality of the glass material (nearly pure silica—$SiO_2$) used in making optical fibers. In 1970, an acceptable loss for glass fiber was in the range of 20 dB/km; whereas today, losses are generally below 0.25 dB/km. Indeed, the theoretical minimum loss for glass fiber is about 0.16 dB/km, and it occurs at a wavelength of about 1550 nanometers (nm). Nature appears to favor optical transmission in this wavelength region because this is where Erbium-doped fiber amplifiers operate, and they have become the most practical optical amplifiers available. In such an amplifier, the Erbium ions within an optical fiber are "pumped" with energy in a first wavelength region (e.g., 980 nm), and then release that energy into a second wavelength region (e.g., 1530–1565 nm) when the Erbium ions are stimulated by optical signals in that second wavelength region.

Numerous considerations are involved in the design of an optical fiber that must necessarily cooperate to provide a commercially acceptable product. In general it is desirable for transmission loss to be low; for the fiber to be able to tolerate a modest amount of bending without experiencing excessive loss; for the fiber to have a known dispersion over a predetermined wavelength range; for the dispersion slope to be relatively low, and for the fiber to have a cutoff wavelength that is appropriate for singlemode transmission at the system wavelength. As discussed, high quality glass materials have been developed that provide low transmission loss, but high quality glass is insufficient in itself to satisfy all of the desired features of modern optical fibers.

Many desirable features need to be addressed by the refractive-index profile of the fiber, which describes how its index of refraction varies as a function of distance from its central axis. Parameters used for describing the refractive-index profile are generally referenced to the index of refraction of the outermost layer of glass. Idealized models of refractive-index profile frequently comprise axially symmetric rings of different refractive index. However, changing the size and shape of any one of these rings generally impacts more than one characteristic of the fiber (e.g., dispersion slope may be reduced, but transmission loss is increased); and it is a significant design effort to create a refractive-index profile that provides all of the desired features and is still easy to manufacture.

For example, U.S. Pat. No. 5,878,182 discloses designs for positive and negative dispersion fibers that have a low slope in the Erbium amplifier region. And while these designs are effective to achieve a desired result, the manufacturing tolerances of the negative-dispersion fiber shown in FIG. 3C of this patent are tighter than desirable.

Another optical fiber that provides a low-dispersion slope across the Erbium amplifier region has a refractive-index profile that resembles a donut, and it is shown at pages 259–260 of the OFC '95 Technical Digest in an article entitled: Dispersion-shifted single-mode fiber for high-bit-rate and multiwavelength systems. This design comprises a ring of high index material surrounding a core of low index material. However, such an index profile would appear to have higher transmission loss and/or higher bending sensitivity than is desirable.

Accordingly, what is desired, but does not appear to be disclosed in the prior art, is an easily manufactured optical fiber that exhibits low transmission loss, low bending sensitivity, and negative dispersion with a low slope in the Erbium amplifier region.

SUMMARY OF THE INVENTION

The problems of the prior art are overcome by an optical fiber having a refractive-index profile comprising two annular rings of controlled-index material between a central core region and an outer cladding. The first annular ring is adjacent to the central core and has an index of refraction that is lower than that of the cladding. The second annular ring is adjacent to the cladding and has an index of refraction that is higher than that of the cladding. In particular, the core has a nominal refractive index, $n_1$, the cladding has a nominal refractive index, $n_2$, the first annular ring has a nominal refractive index, $n_3$, and the second annular ring has a nominal refractive index, $n_4$. The refractive-index profile is indicated below:

Central Core Region: $0.45<(n_1-n_2)n_2<0.58$;

First Annular Ring: $-0.09<(n_3-n_2)n_2<-0.05$; and

Second Annular Ring: $0.20<(n_4-n_2)n_2<0.28$.

Additionally, the first annular ring has a width of about 4.5±1.5 micrometers.

It has been found that by constructing the first annular ring as relatively wide but shallow trench of depressed refractive index material, that a negative-dispersion fiber having a low slope in the Erbium amplifier region can be readily manufactured.

In an illustrative embodiment of the invention, the optical fiber has a dispersion that is more negative than about −0.8 ps/(nm-km), preferably −3.0±1.7 ps/(nm-km), and a slope that is less than 0.05 ps/(nm²-km) over the wavelength region 1530–1565 nm. The first annular ring includes fluorine doping to decrease the index of refraction.

The negative-dispersion optical fiber of the present invention is illustratively used in a WDM system with dispersion compensation, whose overall length exceeds 50 km. Advantageously, the optical fiber has an average transmission loss at 1550 nm that is about 0.20 dB/km; an effective area that is greater than 50 $\mu m^2$, and a index profile that renders it relatively insensitive to bending loss.

BRIEF DESCRIPTION OF THE DRAWING

The invention and its mode of operation will be more clearly understood from the following detailed description when read with the appended drawing in which.

DETAILED DESCRIPTION

Background

Various mechanisms limit a fiber's bandwidth. In multimode fiber, for example, there is modal dispersion in which pulses of light that enter one end of the fiber are spread as they emerge from the other end of the fiber. This is because multimode fiber supports hundreds of different modes (paths) of a particular wavelength. And when the different modes are combined at the other end of the fiber, the net result is pulse spreading (dispersion), which is undesirable. Unless otherwise stated, dispersion means chromatic or "linear" dispersion. Conventionally, the sign of the dispersion is deemed positive in the situation wherein short-wavelength radiation has greater velocity than long-wavelength radiation.

A fiber can also be designed to support only the fundamental mode ($LP_{01}$) of a particular wavelength. Such fiber is designated "singlemode." It has a bandwidth that is much greater than multimode fiber and can transmit optical signals at proportionally greater speeds. Nevertheless, singlemode fiber will behave as though it were multimode fiber for wavelengths that are shorter than the $LP_{11}$ cutoff wavelength, which is determined by the core radius ($a$), the index of refraction (n), and the fractional core/cladding index difference ($\Delta$). Indeed, as $\Delta$ and $a$ decrease, fewer and fewer modes propagate until only one mode propagates at wavelengths longer than the $LP_{11}$ cutoff wavelength. Accordingly, the $LP_{11}$ cutoff wavelength needs to be shorter than the wavelengths to be transmitted by a suitable amount.

Figure 1:
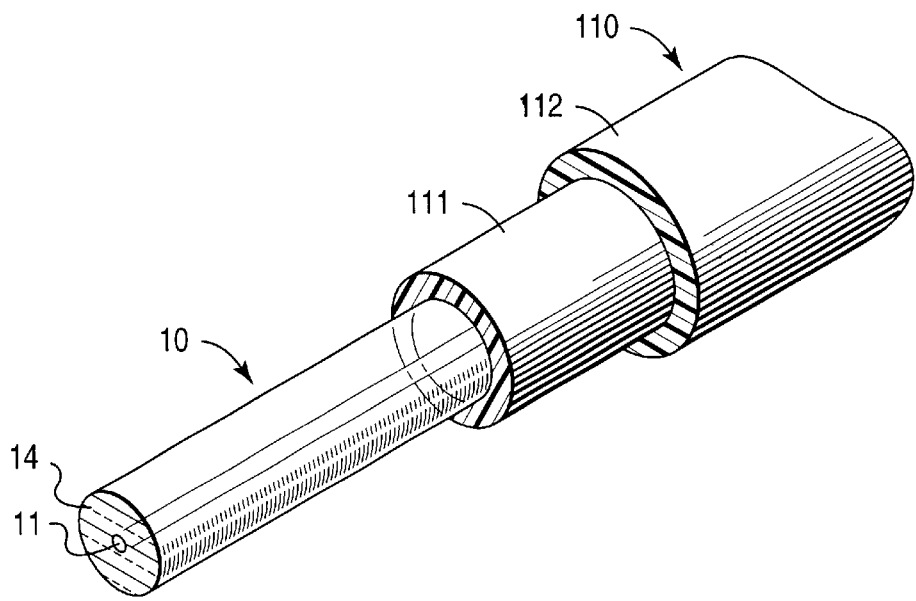
FIG. 1 is a perspective view of a know optical fiber having two protective coating layers.

In the manufacture of optical fiber, a glass preform rod is suspended vertically and moved into a furnace at a controlled rate. The preform softens in the furnace and a glass fiber is drawn freely from the molten end of the preform rod by a capstan located at the base of a draw tower. (Although the drawn fiber has a diameter that is thousands of times smaller than the preform rod, it has the same refractive-index profile!) Because the surface of the glass fiber is susceptible to damage caused by abrasion, it is necessary to coat the fiber after it is drawn but before it is exposed to contaminants or abrasion. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid by exposure to electromagnetic radiation. FIG. 1 discloses a dual-coated optical fiber 110, whose structure is suitable for use in the present invention. As shown, two layers of coating materials are applied to the drawn glass fiber 10, which comprises a light-carrying core 11 and a cladding 14. Clad fiber 10 has a diameter of about 125 $\mu$m. An inner layer 111. referred to as a primary coating material, is applied to the glass fiber 10; and an outer layer 112, referred to as a secondary coating material, is applied to the primary coating material 111. The secondary coating material generally has a relatively high modulus (e.g., $10^9$ Pa) to withstand handling, whereas the primary coating material has a relatively low modulus (e.g., $10^6$ Pa) to provide a cushion that reduces microbending losses. The secondary material may be applied while the primary coating is still wet, and then both coatings are simultaneously cured by radiation in the ultraviolet region of the electromagnetic spectrum.

Figure 2:
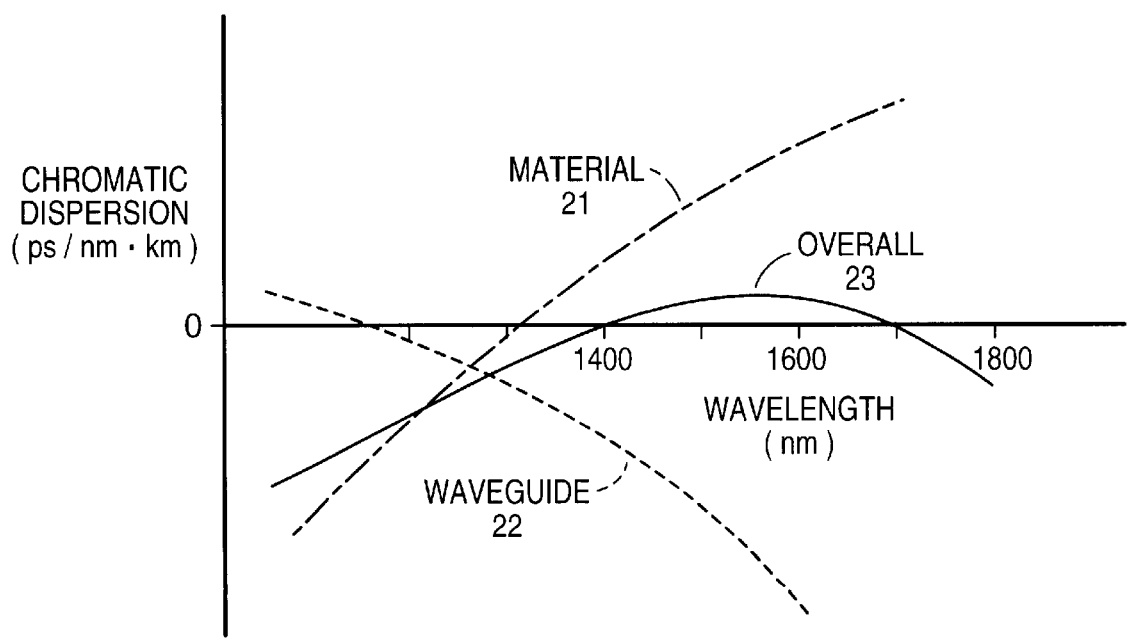
FIG. 2 is a graph of the overall chromatic dispersion of a dispersion-flattened fiber, as a function of wavelength, showing its material dispersion and waveguide dispersion components.

FIG. 2 illustrates the chromatic dispersion of a prior-art optical fiber and, more particularly, how an overall dispersion-flattened characteristic 23 is created through the additive combination of material and waveguide dispersion components. (Dispersion-flattened fibers generally have zero dispersion at two wavelengths—e.g., 1400 nm and 1700 nm.) Recall that material dispersion is intrinsically associated with the actual material used in making the optical fiber. Here, material dispersion 21 is associated with silica glass. Waveguide dispersion 22, on the other hand, is a function of the refractive-index profile. Unlike material dispersion, waveguide dispersion can be shaped, within limits, by the design engineer. This particular refractive-index profile has been used in the design of dispersion-flattened fibers wherein the chromatic dispersion is reduced over the broad wavelength region extending from 1400–1700 nm.

Figure 3A:
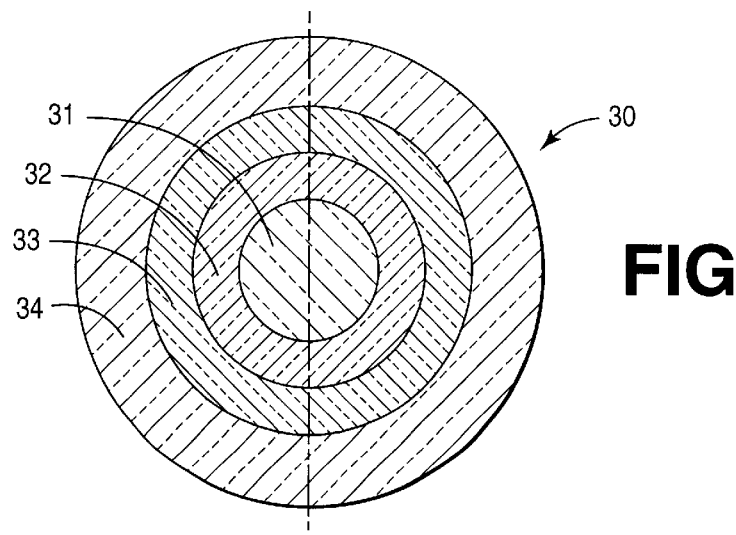
FIG. 3A is a cross-section view of an uncoated optical fiber showing several layers of different refractive index materials.

Reference is now made to FIG. 3A, which generally discloses a cross section of an uncoated glass fiber 30 showing a plurality of layers 31–34—each having a different index of refraction for modifying the waveguide dispersion characteristic of the fiber. FIG. 3A suggests that changes in refractive index are abrupt between layers, although this is not necessarily the case. Gradual index changes are more common and such fibers are known as graded index fibers. Nevertheless, to facilitate an understanding of the present invention, abrupt changes are shown. It is understood that the present invention contemplates graded index fibers also.

Optical fiber 30 comprises a central core region 31 whose index of refraction is nominally $n_1$. Central core region 31 is surrounded by a first annular ring 32 of nominal refractive index $n_3$, which in turn is surrounded by a second annular ring 33 of nominal refractive index $n_4$. An outer cladding 34 of nominal refractive index $n_2$ surrounds the second annular ring. It is noted that the drawing of FIG. 3A is not to scale since the diameter of cladding layer 34 is about 125 microns, while the diameter of the central core 31 is about 8 microns.

Rather than graphing the refractive-index profile using the actual values of the index of refraction, it is convenient to show its profile as a function of normalized refractive-index differences, $\Delta_1$, $\Delta_2$ and $\Delta_3$, which are defined as follows:

$$\Delta_1 \approx (n_1 - n_2)n_2 \times 100\%$$

$$\Delta_2 \approx (n_3 - n_2)n_2 \times 100\%$$

$$\Delta_3 \approx (n_4 - n_2)n_2 \times 100\%$$

Figure 3B:
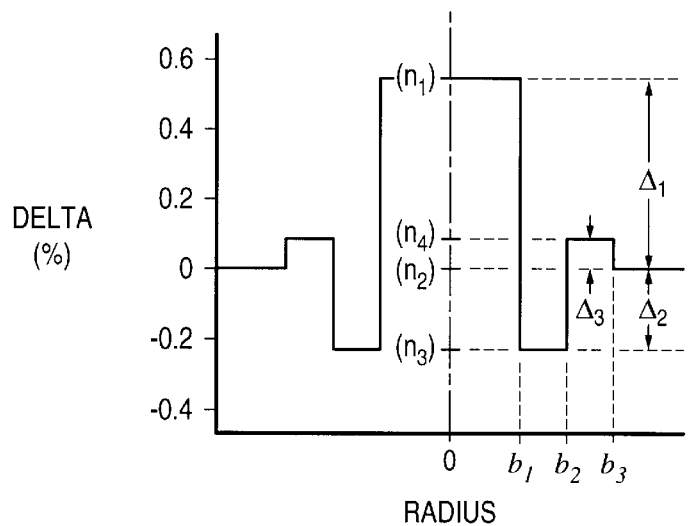
FIG. 3B discloses a refractive-index profile of a known optical fiber.

FIG. 3B discloses a known refractive-index profile (see U.S. Pat. No. 5,878,182) for a negative-dispersion fiber having a low slope in the Erbium amplifier region. This fiber includes a first annular ring whose outer radius is $b_1$ and whose inner radius is $b_2$. The actual width of this ring $(b_2-b_1)$ is only about 1.8 microns, which is relatively tight in view of manufacturing tolerances. A significant improvement is achieved using the refractive index profile shown in FIG. 3C which, in accordance with the present invention, provides an easily manufactured, negative-dispersion fiber having a low slope in the Erbium amplifier region with low bending loss. It has been found that these fiber qualities are achieved over a range of values for $\Delta_1$, $\Delta_2$ and $\Delta_3$, wherein:

$$0.45 < \Delta_1 < 0.58;$$

$$-0.09 < \Delta_2 < -0.05; \text{ and}$$

$$0.20 < \Delta_3 < 0.28$$

Moreover, the first annular ring has an outer radius, $c_2$, and an inner radius, $c_1$, such that the width of this ring $(c_2-c_1)$ is about 4.5±1.5 micrometers.

In a preferred embodiment of the invention, $\Delta_1=0.52$, $\Delta_2=-0.08$, and $\Delta_3=0.24$. Also in the preferred embodiment, the radiuses of the various layers are: $c_1=2.7\ \mu m$; $c_2=7.2\ \mu m$; and $c_3=9.0\ \mu m$. The refractive-index profile disclosed in FIG. 3C comprises a germanium-doped silica core, a fluorine-doped first annular ring, a germanium-doped second annular ring, and a pure silica outer cladding. Nevertheless, it is understood that the core and the cladding layers do not need to be constructed in this manner since it is the relative difference in refractive indexes that provides the benefits of the present invention. For example, the core can be made from pure silica, while the annular rings and the cladding can have different levels of fluorine doping.

A specification table for an optical fiber, suitable for use in the present invention, has been developed. However, it is not intended to define the entire range of acceptable fibers and is presented for illustrative purposes only.

ILLUSTRATIVE FIBER SPECIFICATION TABLE

| | |
|---|---|
| Attenuation at 1550 nm | <0.21 dB/km (average) |
| Mode field diameter | 8.4 ± 0.6 microns (1550 nm) |
| Core eccentricity | <0.8 microns |
| Cladding diameter | 125 ± 1.0 micron |
| Cutoff wavelength | <1450 nm (2m reference length) |
| Dispersion | −3.0 ± 1.7 ps/(nm-krn) (1530–1565 nm) |

ILLUSTRATIVE FIBER SPECIFICATION TABLE
-continued

| | |
|---|---|
| Dispersion slope | <+0.05 ps/(nm$^2$–km) (average) |
| Macrobending | <0.5 dB at 1550 nm (1 turn,32 mm) |
| | <0.1 dB at 1550 nm (100 turns, 75 mm) |
| Coating diameter | 250 ± 10 microns |
| Proof test | 200 kpsi |

Detailed descriptions of suitable procedures for fabrication are readily available. Preforms may be monolithic or composite. Core regions are preferably formed by Modified Chemical Vapor Deposition or by one of the processes using soot chemistry—Outside Vapor Deposition or Vapor Axial Deposition. Known procedures (e.g., for cladding, overcladding, coating, cabling, etc.) are unaffected by the fiber design.

Figure 4:
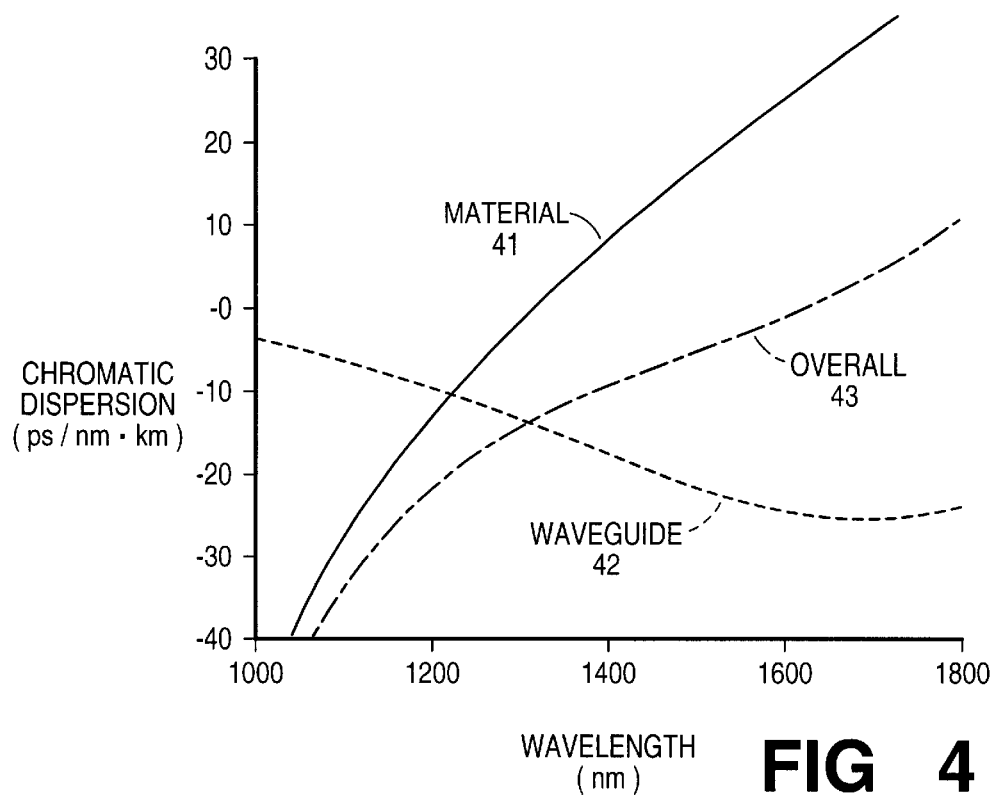
FIG. 4 is a graph of the chromatic dispersion of a fiber in accordance with the present invention, as a function of wavelength, showing its material dispersion and waveguide dispersion components.

FIG. 4 discloses the chromatic dispersion characteristic 43 of an optical fiber in accordance with the present invention. In particular, it discloses how a low dispersion slope is created through the additive combination of material and waveguide dispersion components 41, 42 respectively. Although the waveguide dispersion curve 22 in FIG. 2 for a dispersion-flattened fiber also exhibits a negative slope, waveguide dispersion increases rapidly at long wavelengths in order to create the second dispersion null (shown at 1700 nm) and a flat overall dispersion curve 23. However, such flattening is actually caused as the fundamental mode starts to effectively cutoff, and this leads to undesirably high bending loss.

Figure 3C:
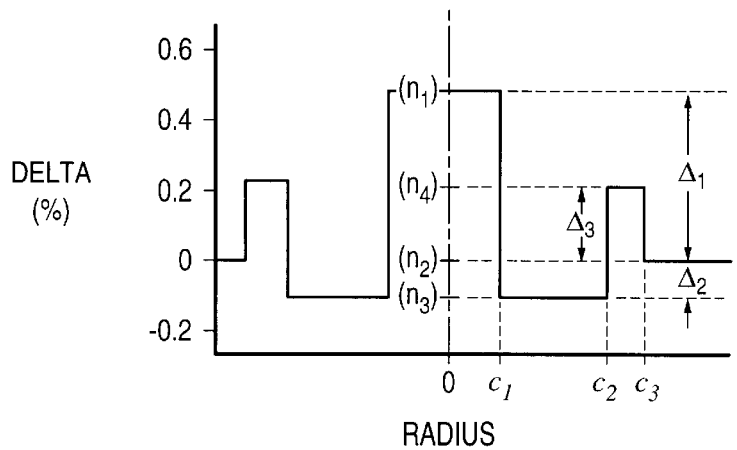
FIG. 3C discloses a refractive-index profile of an optical fiber in accordance with the present invention.
Figure 5:
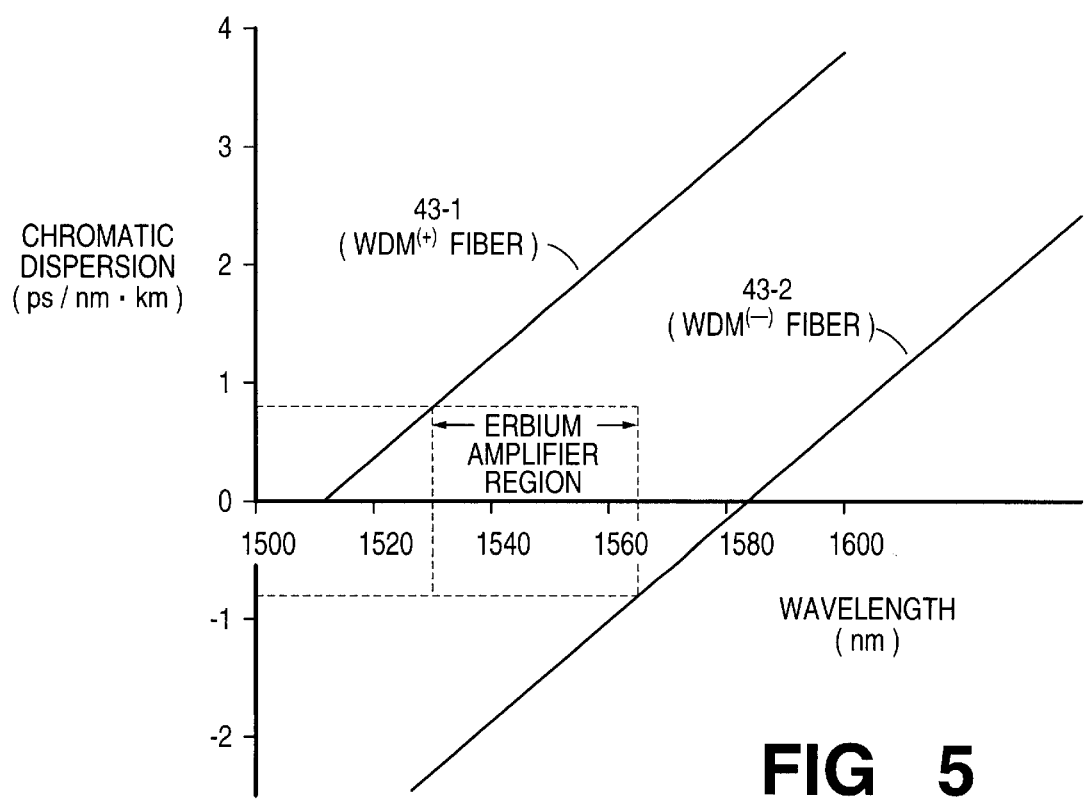
FIG. 5 is a graph of the chromatic dispersion of an optical fiber of the present invention, showing its characteristics with detail in the Erbium amplifier region.

FIG. 5 is a graph of the chromatic dispersion of a positive-dispersion fiber 43-1, and a negative-dispersion fiber 43-2 having the refractive-index profile shown in FIG. 3C. Each of these fibers has an average loss that is less than 0.21 dB/km at 1550 nm; an effective area that is greater than 50 $\mu m^2$; and each of these fibers has a dispersion whose absolute magnitude is greater than 0.8 ps (nm-km) in the wavelength region (1530–1565 nm) served by Erbium-doped fiber amplifiers. More importantly, each of these fibers has a dispersion slope that is less than about 0.05 ps/(nm$^2$-km) at 1550 nm. These characteristics render the fibers 43-1, 43-2 ideal for use in the transmission of WDM signals where low loss and a small amount of dispersion across the Erbium amplifier region are desirable. (By way of contrast, an unshifted silica fiber is one having a dispersion null point, $\lambda_0$, at about 1310 nm, a dispersion of about +17 ps/(nm-km) at 1550 nm, and a dispersion slope of about 0.095 ps/(nm$^2$-km) at 1550 nm.)

Figure 6:
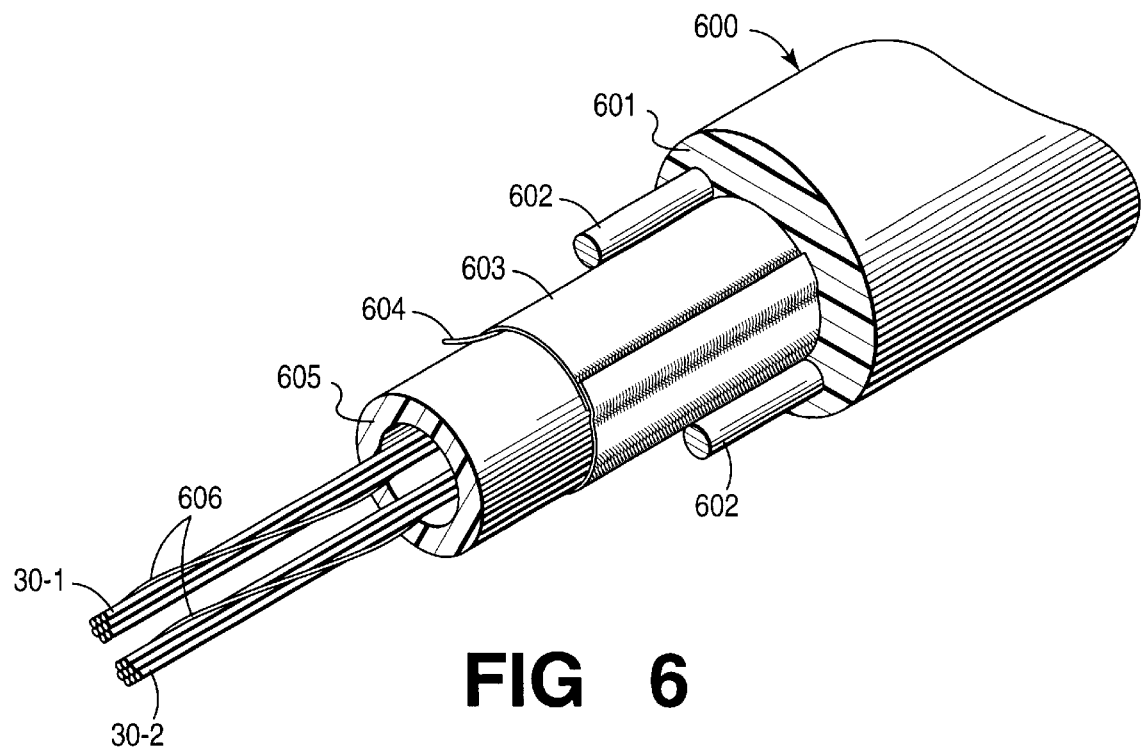
FIG. 6 is a perspective view of a cable containing groups of optical fibers in accordance with the invention.
Figure 7:
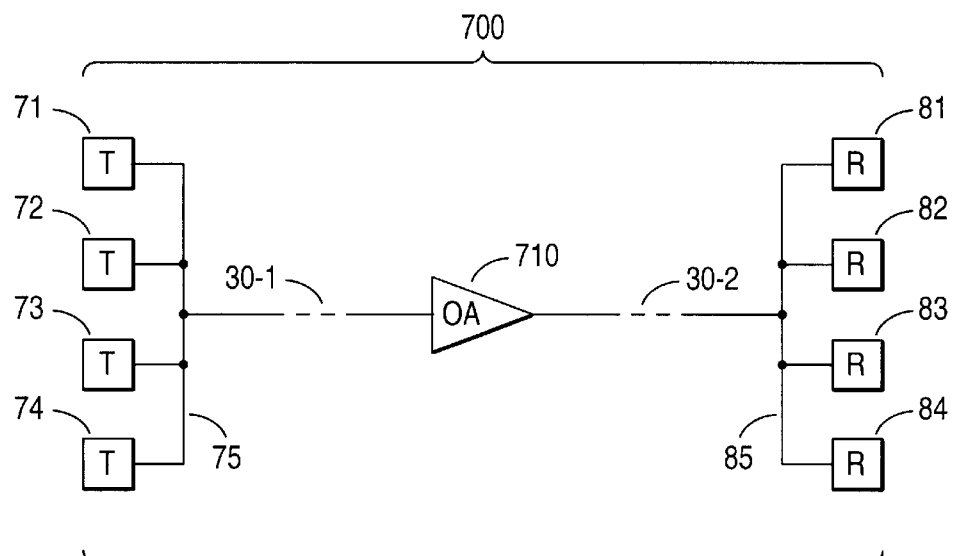
FIG. 7 discloses a four-channel WDM system operating over a transmission path containing positive and negative dispersion fibers as well as an Erbium-doped fiber amplifier.

FIG. 6 provides detail regarding the construction of a practical cable according to the present invention. Optical cable 600 includes two bundles of optical fibers that are loosely wrapped with a yarn binder 606 to form an identifiable unit. One of the bundles preferably includes positive-dispersion fibers 30-1. while the other bundle preferably includes negative-dispersion fibers 30-2—as discussed in U.S. Pat. No. 5,611,016. And while it is preferable to segregate positive- and negative-dispersion fibers into separate groups or units, it is not necessary in the practice of the invention. These bundles are disposed within a tubular member 605, which is made from a dielectric material such as polyvinyl chloride or polyethylene, for example. Surrounding tubular member 605 is a sheath system that includes: a water-absorbing tape 603, a plastic jacket 601, which is illustratively made from a polyethylene material; and strength members 602—602, which are illustratively made from steel or epoxy-impregnated glass fibers. The strength members are used to eliminate or reduce stresses that might otherwise be applied to the optical fibers during handling or normal service, and may be included within the cable 600 in any number of known ways. A rip cord 604, made of Kevlar® plastic, facilitates removal of the entire sheath system 601–603. Typically, a filling material is disposed within the tubular member 605 that serves to cushion the fibers contained therein, thereby protecting them against microbending loss FIG. 7 discloses a WDM system 700 in accordance with the invention. It consists of four transmitters 71–74 that modulate four predetermined wavelengths in the 1530–1565 nm region with four different baseband signals. The modulated wavelengths are then combined via a passive 4:1 coupler 75 and introduced into a fiber transmission line 30-1, 30-2 that includes an optical amplifier 710—preferably an Erbium-doped fiber amplifier. In the embodiment of FIG. 7, fiber transmission line 30-1 comprises a predetermined length of positive-dispersion fiber while fiber transmission line 30-2 comprises a predetermined length of negative-dispersion fiber according to the present invention. At the receiver end, the four-channels are split by demultiplexer 85, according to their wavelengths, and processed by receivers 81–84 to extract the individual baseband signals.

Although various particular embodiments have been shown and described, modifications are possible within the scope of the invention. These modifications include, but are not limited to, refractive-index profiles that gradually taper between adjacent layers (e.g., graded-index profiles); variations in the widths of the layers; the use of different doping materials to achieve the same general profile shapes; and the use of plastic materials, rather than glass, in making the optical fiber. It is noted that in many practical fibers, an index depression exists at the center of the core region due to the manufacturing process used in making the fiber. Moreover, it is understood that FIG. 3C shows an idealized profile, the present invention includes index profiles having gradual transitions between adjacent rings.

What is claimed is:

1. A glass fiber having a chromatic dispersion that is more negative than about −0.8 ps/(nm-km) for all wavelengths within the region 1530–1565 nm, the optical fiber comprising a central core region having a maximum refractive index, $n_1$, and a layer of transparent cladding material on the outer surface of said glass fiber having a nominal refractive index of $n_2$ wherein $$0.45 < (n_1 - n_2)/n_2 < 0.58$$

characterized in that
the glass fiber includes a first annular region of transparent material adjacent to the central core region, said first annular region having a width of about 4.5±1.5 micrometers and a refractive index, $n_3$, wherein $$-0.09 < (n_3 - n_2)/n_2 < -0.05; \text{ and}$$

the glass fiber further includes a second annular region of transparent material adjacent to the outer cladding whose refractive index is $n_4$, wherein $$0.20 < (n_4 - n_2)/n_2 < 0.28.$$

2. The optical fiber of claim 1 wherein the optical fiber has a dispersion slope that is less than 0.05 ps/(nm²-km) over the wavelength region 1530–1565 nm.

3. The optical fiber of claim 1 wherein the chromatic dispersion is −3.0±1.7 ps/(nm-km) over the wavelength region 1530–1565 nm.

4. The optical fiber of claim 1 wherein central core region comprises a germanium-doped silica material.

5. The optical fiber of claim 1 wherein the first annular ring comprises a fluorine-doped silica material.

6. The optical fiber of claim 1 wherein second annular ring comprises a germanium-doped silica material.

7. The optical fiber of claim 1 wherein outer cladding region comprises non-doped silica material.

8. The optical fiber of claim 1 wherein the fiber is enclosed within a sheath system that includes a plastic jacket, thereby defining an optical cable.

9. A glass fiber having a material dispersion, and having a refractive-index profile that is selected to generate negative waveguide dispersion such that the overall dispersion of said fiber, equal to the sum of said material dispersion and said waveguide dispersion, has a slope that is less than 0.05 ps/(nm²-km), and has a chromatic dispersion that is more negative than about −0.8 ps/(nm-km) at a given wavelength within the region 1530–1565 nm, said fiber having a refractive-index profile comprising first and second annular rings of controlled-index material between a central core region and an outer cladding, the central core region comprising germanium-doped silica and having an outer diameter of about 2.7±1.0 microns;

the first annular ring comprising fluorine-doped silica and having an outer diameter of about 7.2±1.0 microns;

the second annular ring comprising germanium-doped silica and having an outer diameter of about 9.0±1.0 microns, and the cladding comprising approximately pure silica.

10. The glass fiber of claim 9 wherein the central core region has a maximum refractive index $n_1$, the first annular ring has a nominal refractive index $n_3$, the second annular ring has a nominal refractive index $n_4$, and the cladding has a nominal refractive index $n_2$, wherein:

$$0.45 < (n_1 - n_2)n_2 < 0.58;$$

$$0.09 < (n_3 - n_2)n_2 < -0.05; \text{ and}$$

$$0.20 < (n_4 - n_2)n_2 < -0.28.$$

11. An optical communications cable including a plurality of optical fibers enclosed within a sheath system that includes a plastic jacket, each of the plurality of fibers having an overall chromatic dispersion that is more negative than −0.8 ps/(nm-km) over the wavelength region 1530–1565 nm, each of the plurality of fibers having a refractive-index profile comprising two annular rings of controlled-index material between a central core region and an outer cladding, the central core region having a nominal refractive index $n_1$, the first annular ring having a nominal refractive index $n_3$, the second annular ring having a nominal refractive index $n_4$, and the cladding having a nominal refractive index $n_2$, wherein:

$$0.45 < (n_1 - n_2)n_2 < 0.58;$$

$$0.09 < (n_3 - n_2)n_2 < -0.05; \text{ and}$$

$$0.20 < (n_4 - n_2)n_2 < -0.28.$$

the first annular ring has a width of about 4.5±1.5 micrometers.

12. A dispersion-compensated optical fiber system comprising:

a first optical fiber having a chromatic dispersion that is more positive than +0.8 ps/(nm-km) for all wavelengths over the wavelength region 1530–1565 nm, said first optical fiber having a length that exceeds 50 kilometers; and a second optical fiber connected in series with the first optical fiber, the second optical fiber having an overall chromatic dispersion that is more negative than −0.8 ps/(nm-km) over the wavelength region 1530–1565 nm, each of the plurality of fibers having a refractive-index profile comprising two annular rings of controlled-index material between a central core region and an outer cladding, the central core region having a nominal refractive index $n_1$, the first annular ring having a nominal refractive index $n_3$, the second annular ring having a nominal refractive index $n_4$, and the cladding having a nominal refractive index $n_2$, wherein:

$0.45 < (n_1-n_2)n_2 < 0.58;$ $0.09 < (n_3-n_2)n_2 < -0.05;$ and $0.20 < (n_4-n_2)n_2 < -0.28.$ the first annular ring has a width of about 4.5±1.5 micrometers.

13. The dispersion-compensated system of claim 12 further comprising: plural sources of optical signals modulated at different wavelengths within the region 1530–1565 nanometers;

apparatus for multiplexing the optical signals at the input of the system; and apparatus for demultiplexing the optical signals at the output of the system.

14. The dispersion-compensated system of claim 12 further including an optical amplifier. which is connected in series with the first and second optical fibers.

15. The dispersion-compensated system of claim 14 wherein the optical amplifier comprises an Erbium-doped fiber amplifier.

* * * * *